United States Patent
Karuppaswamy

(10) Patent No.: US 9,944,233 B2
(45) Date of Patent: Apr. 17, 2018

(54) ROOF RACK ASSEMBLY AND A VEHICLE

(71) Applicant: GM GLOBAL TECHNOLOGY OPERATIONS LLC, Detroit, MI (US)

(72) Inventor: Senthil N. Karuppaswamy, Rohester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 15/216,217

(22) Filed: Jul. 21, 2016

(65) Prior Publication Data

US 2018/0022285 A1    Jan. 25, 2018

(51) Int. Cl.
| | |
|---|---|
| *B60R 9/045* | (2006.01) |
| *B60R 9/055* | (2006.01) |
| *E04H 15/06* | (2006.01) |
| *E04H 15/30* | (2006.01) |

(52) U.S. Cl.
CPC ............ *B60R 9/045* (2013.01); *E04H 15/30* (2013.01); *B60R 9/055* (2013.01); *E04H 15/06* (2013.01)

(58) Field of Classification Search
CPC .......... B60R 9/04; B60R 9/045; B60R 9/055; E04H 5/06; E04H 5/08; E04H 5/30
USPC ...... 224/400, 484, 486, 309–331; 135/88.14, 135/88.16; 296/160, 163
See application file for complete search history.

(56) References Cited

U.S. PATENT DOCUMENTS

| | | | | |
|---|---|---|---|---|
| 3,040,756 A | * | 6/1962 | Zerbe ................... | E04H 15/06 135/141 |
| 3,174,536 A | * | 3/1965 | Francis ................. | B60J 11/08 160/369 |
| 3,472,252 A | * | 10/1969 | Siebring .................. | B60P 3/38 135/118 |
| 3,652,000 A | * | 3/1972 | Steinhoff ................ | B60R 9/055 224/320 |
| 3,707,977 A | * | 1/1973 | Grady ..................... | B60P 3/343 135/139 |
| 3,861,572 A | * | 1/1975 | Norris ....................... | B60P 3/38 135/153 |
| 4,099,534 A | * | 7/1978 | Corbin ................... | E04H 15/06 135/150 |
| 4,101,062 A | * | 7/1978 | Lazar ....................... | B60P 3/38 224/314 |
| 4,457,553 A | * | 7/1984 | Larkin .................... | B60R 15/00 135/114 |

(Continued)

OTHER PUBLICATIONS

Rhino-Rack Sunseeker Awning from webpage http://www.rhinorack.dk/AccSubCategory_Sunseeker-Awning_57.aspx; accessed on Oct. 16, 2015; 2 pages.

(Continued)

*Primary Examiner* — Justin Larson
(74) *Attorney, Agent, or Firm* — Quinn IP Law

(57) ABSTRACT

A roof rack assembly, and a vehicle including the roof rack assembly, includes a support structure and a multifunctional apparatus supported by the support structure. The multifunctional apparatus is configured to operate as an awning structure, a concealment structure and a storage structure. At least a portion of the multifunctional apparatus is movable relative to the support structure between a storage position in which the multifunctional apparatus is not operable and a use position in which the multifunctional apparatus is operable.

17 Claims, 3 Drawing Sheets

(56) References Cited

U.S. PATENT DOCUMENTS

| | | | | |
|---|---|---|---|---|
| 6,908,138 B2* | 6/2005 | Yang | ................ | B60J 11/025 135/88.1 |
| 6,997,497 B2* | 2/2006 | Sagi | ................ | B60R 9/055 224/309 |
| 7,237,826 B2* | 7/2007 | Sagi | ................ | B60R 9/055 220/4.12 |
| 7,562,928 B1* | 7/2009 | Morazan | ................ | B60J 11/00 296/136.01 |
| 8,876,189 B1* | 11/2014 | Williams | ................ | E04H 15/08 296/160 |
| 9,222,278 B2* | 12/2015 | Park | ................ | E04H 15/06 |
| 9,499,999 B2* | 11/2016 | Zhou | ................ | E04H 15/02 |
| 9,739,072 B1* | 8/2017 | Melland | ................ | E04H 15/08 |
| 9,783,033 B2* | 10/2017 | Wang | ................ | B60J 11/02 |
| 2008/0054674 A1* | 3/2008 | Howie | ................ | B60N 3/00 296/136.01 |

OTHER PUBLICATIONS

Eezi Awn Tent Kit for 3met Awning from webpage http://www.expeditioncentre.com.au/online-store/racks-awnings-tents/awnings/eezi-awn-tent-kit-for-3met-awning.html; accessed on Oct. 16, 2015; 1 page.

Rightline Sport 1 Rooftop Cargo Bag from webpage https://www.etrailer.com/Roof-Cargo-Carrier/Rightline-Gear/RL100S10.html; accessed on Oct. 16, 2015; 7 pages.

Elastic Bungee Car / SUV / Truck / Trailer Cargo Roof Rack Basket Net w/Hooks from webpage http://www.aliexpress.com/item/Free-shipping-Tracking-Elastic-Bungee-Car-SUV-Truck-Trailer-Cargo-Roof-Rack-Basket-Net-w-Hooks/1295190329.html; accessed on Oct. 16, 2015; 3 pages.

* cited by examiner ly indicate
ROOF RACK ASSEMBLY AND A VEHICLE

TECHNICAL FIELD

The present disclosure relates to a roof rack assembly and a vehicle.

BACKGROUND

Some vehicles include a body that surrounds a passenger compartment. Part of the body can include a roof disposed above the passenger compartment. Some vehicles include a roof rack secured to the roof.

SUMMARY

The present disclosure provides a roof rack assembly including a support structure and a multifunctional apparatus supported by the support structure. The multifunctional apparatus is configured to operate as an awning structure, a concealment structure and a storage structure. At least a portion of the multifunctional apparatus is movable relative to the support structure between a storage position in which the multifunctional apparatus is not operable and a use position in which the multifunctional apparatus is operable.

The present disclosure also provides a vehicle including a body and the roof rack assembly discussed above. The body includes a roof portion. The roof rack assembly is attached to the body above the roof portion.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Furthermore, the term "substantially" can refer to a slight imprecision or slight variance of a condition, quantity, value, or dimension, etc., some of which that are within manufacturing variance or tolerance ranges.

Referring to the Figures, wherein like numerals indicate like or corresponding parts throughout the several views, a vehicle 10 is generally shown in FIGS. 1-3 and 5, and a roof rack assembly 12 is generally shown in FIGS. 1-6.

The roof rack assembly 12 can be utilized in a vehicle application or a non-vehicle application. Hence, in certain embodiments, the vehicle 10 can include the roof rack assembly 12. Non-limiting examples of the vehicle 10 can include cars, trucks, all-terrain vehicles, off-road vehicles, recreational vehicles, aircrafts, boats, watercrafts, farm equipment or any other suitable vehicle. Non-limiting examples of the non-vehicle can include trailers, farm equipment or any other suitable non-vehicle.

Figure 1:
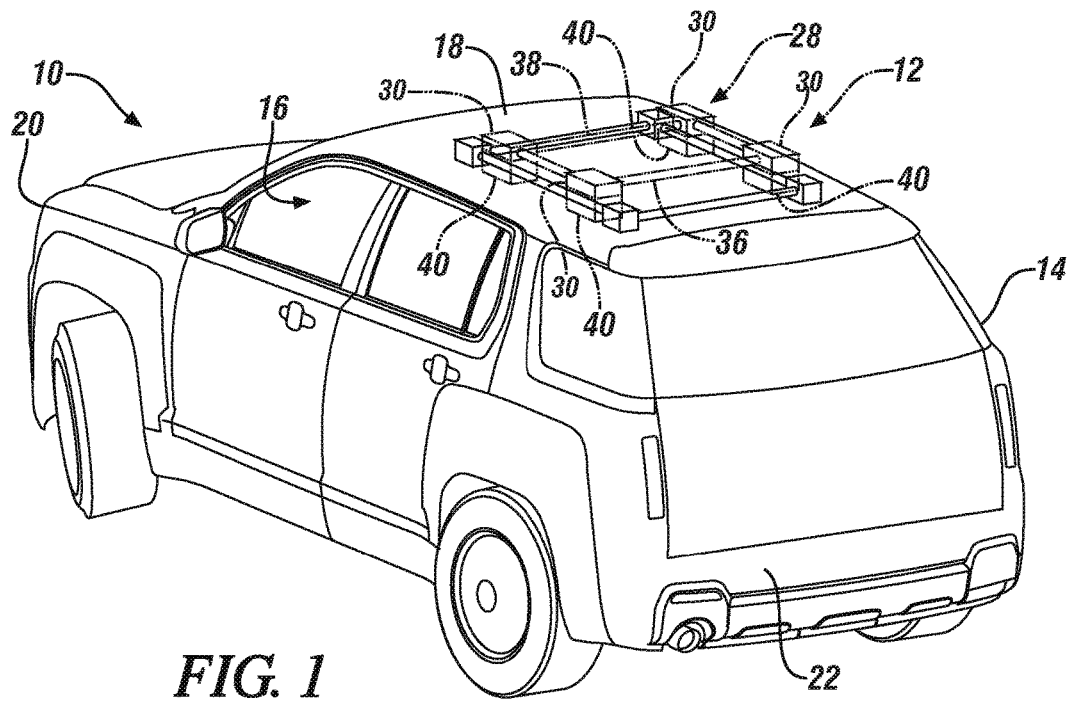
FIG. 1 is a schematic perspective view of a vehicle including a pre-existing roof rack and a multifunctional apparatus illustrated in phantom lines.

Continuing with FIG. 1, the vehicle 10 can include a body 14. The body 14 can include a passenger compartment 16 and a roof portion 18 disposed above the passenger compartment 16. Generally, the roof portion 18 is disposed between a front end 20 of the vehicle 10 and a back end 22 of the vehicle 10. In certain embodiments, the roof portion 18 is disposed between an engine compartment of the vehicle 10 and a storage compartment of the vehicle 10.

Figure 2:
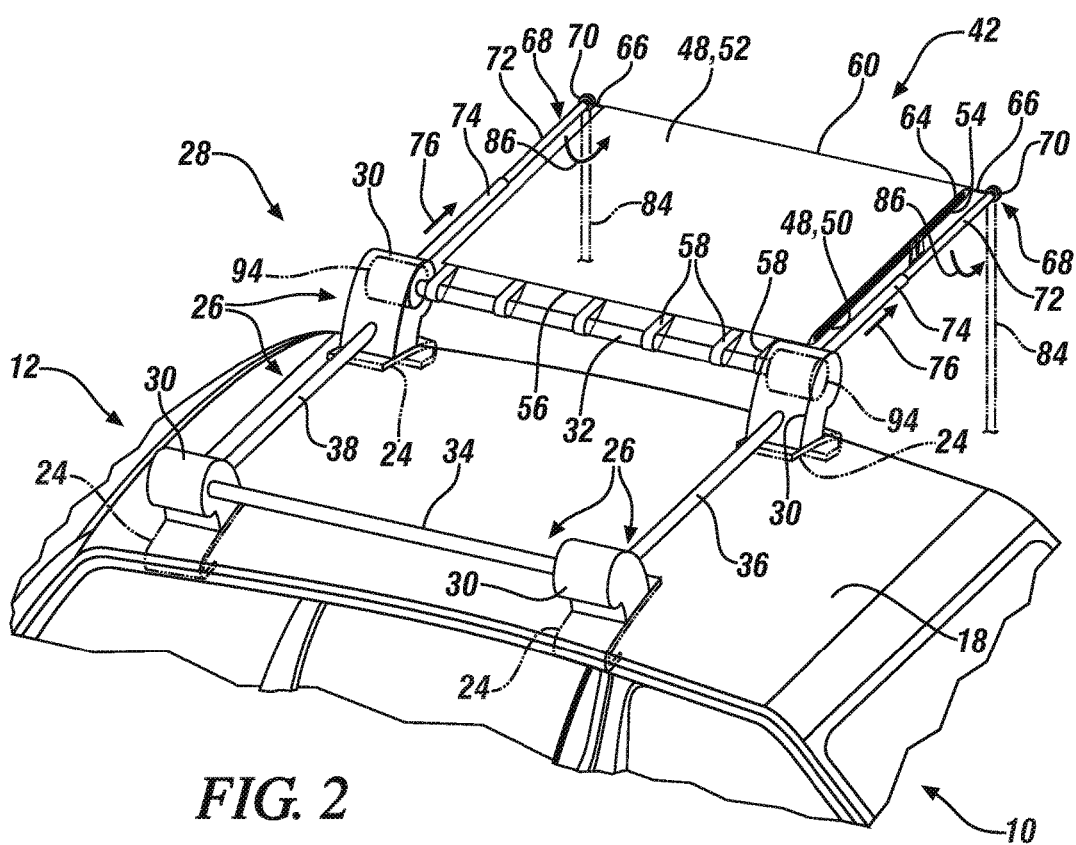
FIG. 2 is a schematic fragmentary perspective view of the vehicle, with the multifunctional apparatus in a use position to operate as an awning structure.
Figure 3:
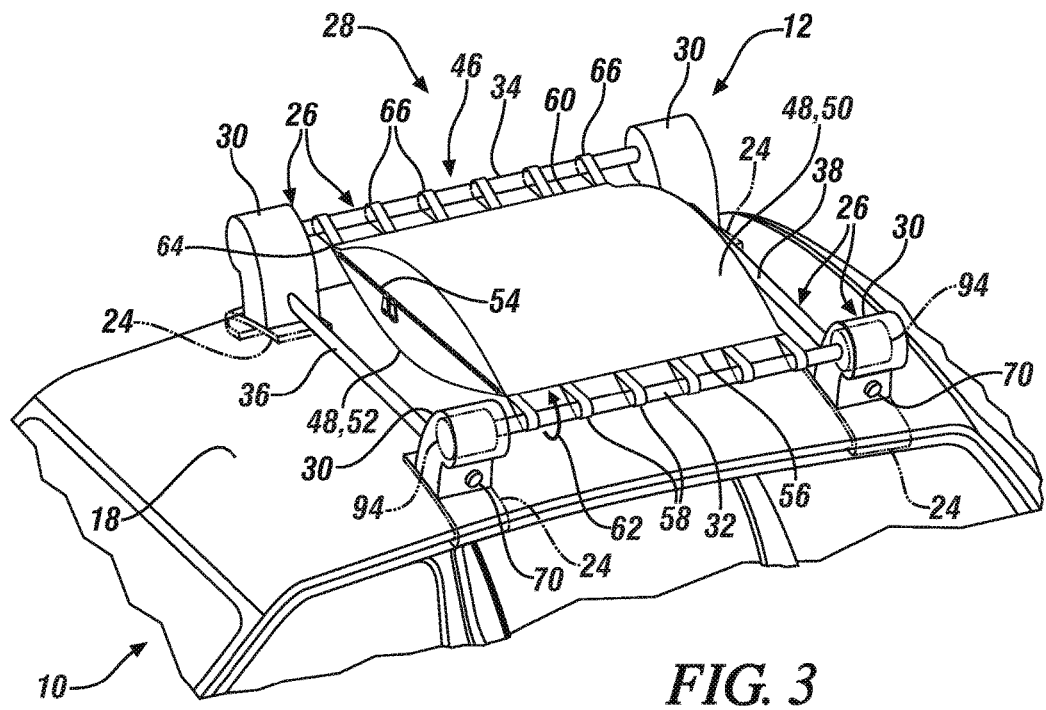
FIG. 3 is a schematic fragmentary perspective view of the vehicle, with the multifunctional apparatus in the use position to operate as a storage structure.

Generally, the roof rack assembly 12 is attached to the body 14 above the roof portion 18. The roof rack assembly 12 can be integrated with the vehicle 10 during the vehicle assembly process or can be an after-market product integrated with the vehicle 10 after the vehicle assembly process. FIG. 1 illustrates the vehicle 10 with an already existing roof rack, in which the roof rack assembly 12 (shown schematically in phantom lines for illustrative purposes) can be secured to as an after-market product. FIGS. 2 and 3 illustrate the vehicle 10 without a pre-existing roof rack, in which the roof rack assembly 12 can be directly attached to the vehicle 10 during the assembly process (as shown in solid lines).

Alternatively, the roof rack assembly 12 can include a plurality of first couplers 24 (as shown in phantom lines) configured to selectively secure the roof rack assembly 12 to the roof portion 18 as an after-market product if the vehicle 10 was initially assembled without a roof rack. Therefore, a user can utilize or remove the roof rack assembly 12 as desired by the first couplers 24. The first couplers 24 can be any suitable configuration, and non-limiting examples include brackets, braces, clamps, straps, etc.

Figure 4:
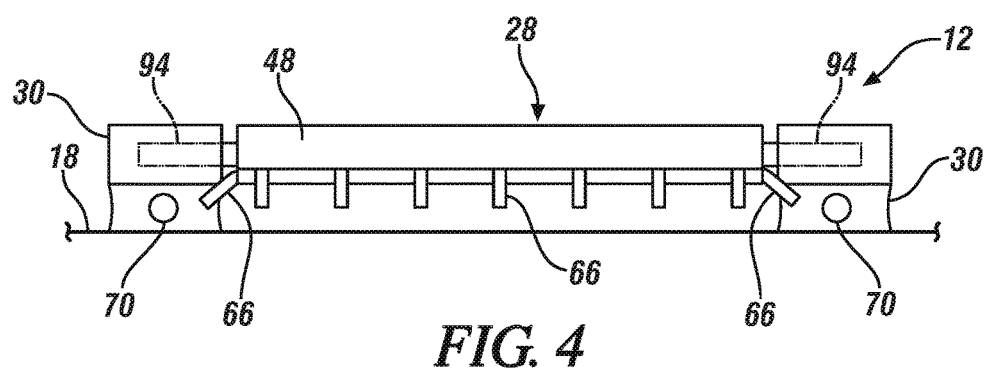
FIG. 4 is a schematic side view of the multifunctional apparatus in a storage position.

As best shown in FIGS. 2-4, the roof rack assembly 12 includes a support structure 26 and a multifunctional apparatus 28 supported by the support structure 26. The support structure 26 can include one or more corner members 30 and one or more legs 32, 34 and housings 36, 38 extending between the respective corner members 30. For illustrative purposes, as best shown in FIGS. 2 and 3, the support structure 26 can include a plurality of corner members 30, a plurality of legs 32, 34 and a plurality of housings 36, 38. Therefore, for example, each of the corner members 30 supports a respective one of the legs 32, 34 and a respective one of the housings 36, 38 to define a generally rectangular configuration.

Furthermore, when the roof rack assembly 12 is an after-market product which is attached to an already existing roof rack as shown in FIG. 1, the roof rack assembly 12 can include a plurality of second couplers 40 configured to selectively secure the roof rack assembly 12 to the existing roof rack. Therefore, the user can utilize or remove the roof rack assembly 12 as desired by the second couplers 40. The second couplers 40 can be any suitable configuration, and non-limiting examples include brackets, braces, clamps, straps, etc.

The multifunctional apparatus 28 is configured to operate as an awning structure 42 (see FIG. 2), a concealment structure 44 (see FIGS. 5 and 6) and a storage structure 46 (FIG. 3). At least a portion of the multifunctional apparatus 28 is movable relative to the support structure 26 between a storage position (see FIG. 4) in which the multifunctional apparatus 28 is not operable and a use position (see FIGS. 2, 3 and 5) in which the multifunctional apparatus 28 is operable. When operating as the awning structure 42, the user can be shielded from above to minimize the sun's rays and/or the rain, etc. from contacting the user. When operating as the concealment structure 44, the user can be concealed from above and around the sides to operate as a tent and/or a changing room, etc. The concealment structure 44 can also minimize the sun's rays and/or the rain, etc., from contacting the user. When operating as the storage structure 46, the user can insert items into the structure to store the items during traveling. Therefore, the storage structure 46 provides additional space to store items instead of inside the passenger compartment 16 or the storage compartment. As such, a single apparatus (i.e., the multifunctional apparatus 28) can operate for multiple different uses, e.g., an awning, a tent, or storage, which eliminates the need to have separate, independent structures attached to the vehicle in separate operations for the uses described herein.

Figure 7:
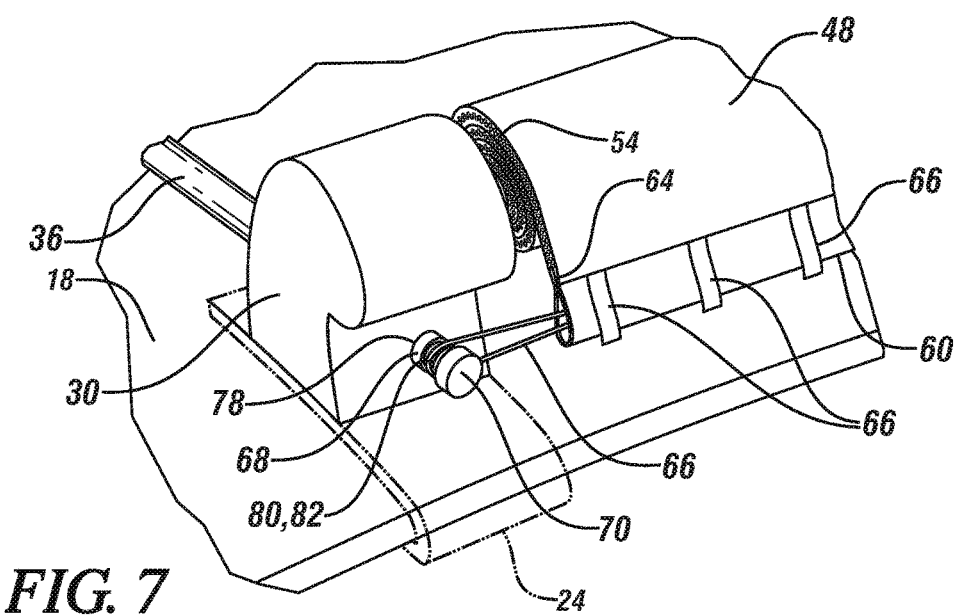
FIG. 7 is a schematic fragmentary enlarged perspective view of the multifunctional apparatus in the storage position.

Generally, the multifunctional apparatus 28 can include a flexible member 48 movable relative to the support structure 26 between a retracted position (see FIGS. 4 and 7) when the multifunctional apparatus 28 is in the storage position and an extended position (see FIGS. 2, 3 and 5) when the multifunctional apparatus 28 is in the use position. The flexible member 48 is movable to different orientations in the use position depending on whether the multifunctional apparatus 28 is to operate as the awning structure 42, the concealment structure 44 or the storage structure 46. Each of the awning, concealment and storage structures 42, 44, 46 will be discussed in turn below.

The flexible member 48 is utilized for each of the awning structure 42, the concealment structure 44 and the storage structure 46. The flexible member 48 is disposed in the same orientation for the awning structure 42 and the concealment structure 44, which is outwardly over a side of the vehicle 10, but the flexible member 48 is disposed in a different orientation for the storage structure 46, which is over the top of the roof portion 18.

The flexible member 48 can be formed of any suitable material(s) configured to allow the flexible member 48 to roll up when the multifunctional apparatus 28 is in the storage position. Non-limiting examples of the material(s) of the flexible member 48 can include canvas, fabric, woven cloth, woven linen, woven cotton, woven hemp, plastic material(s), rubber material(s), composite material(s), etc., and/or combinations thereof. Other non-limiting examples of the material(s) of the flexible member 48 can include a plurality of slats coupled together by hinges such that the slats can move relative to each other through the respective hinges which allows the flexible member 48 to roll up. In this example, the slats can be formed of a rigid material, which can include plastic, metal, composite, etc., and/or combinations thereof.

As best shown in FIG. 3, the flexible member 48 can include a first panel 50 and a second panel 52 overlapping each other. Therefore, the panels 50, 52 create a double ply structure, which can provide additional strength when utilizing the flexible member 48 as the awning structure 42 and the concealment structure 44. When utilizing the storage structure 46, the panels 50, 52 cooperate to provide a cavity therebetween for storing items.

Continuing with FIG. 3, the flexible member 48 can include a closure apparatus 54 coupled to the first and second panels 50, 52 to further define the storage structure 46. The closure apparatus 54 is movable between an open position allowing entry into the flexible member 48 between the first and second panels 50, 52 when in the use position and a closed position preventing entry into the flexible member 48 between the first and second panels 50, 52 when in the storage position. Therefore, when the closure apparatus 54 is in the open position, various items can be inserted into the cavity between the panels 50, 52, and when the closure apparatus 54 is in the closed position, the various items are contained inside the panels 50, 52 until the user desires to remove the items from the flexible member 48.

As discussed above, the support structure 26 can include the plurality of legs 32, 34, and in certain embodiments, referring to FIG. 3, can include a first leg 32 and a second leg 34 spaced from and opposing each other. The first leg 32 can be supported by a pair of the corner members 30 and the second leg 34 can be supported by another pair of the corner members 30. The flexible member 48 can include a first end 56 fixed to the first leg 32 regardless of the flexible member 48 being in the retracted and extended positions. Therefore, the first end 56 of the flexible member 48 can remain fixed to the first leg 32 when the multifunctional apparatus 28 is in the use position and the storage position. The first end 56 can be fixed to the first leg 32 by any suitable fastening feature(s) 58, and non-limiting examples can include one or more of fasteners, tabs, clips, welding, adhesive, snaps, buttons, hook and loop closures, ties, clamps, etc., and/or combinations thereof.

Again, continuing with FIG. 3, the flexible member 48 can also include a second end 60 attached to the second leg 34 when the flexible member 48 is in the extended position to further define the storage structure 46. In the vehicle application where the multifunctional apparatus 28 is operating as the storage structure 46, the flexible member 48 can be disposed over the roof portion 18 when in the extended position as shown in FIG. 3. Therefore, as indicated by arrow 62 in FIG. 3, as the flexible member 48 is unrolled, the flexible member 48 is rotated back over the top of the roof portion 18 when moving to the extended position for the storage structure 46. As such, when the multifunctional apparatus 28 is in the use position for the storage structure 46, the flexible member 48 can be disposed between the legs 32, 34 and the corner members 30 when in the extended position such that the weight of the item(s) inside the flexible member 48 causes the second panel 52 to abut the roof portion 18; and thus, in this configuration, the roof portion 18 at least partially supports the items directly.

As best shown in FIG. 2, the flexible member 48 can include a peripheral edge 64 disposed adjacent to the first and second ends 56, 60 when the flexible member 48 is in the extended position. In certain embodiments, the closure apparatus 54 can be secured to the peripheral edge 64. On the opposite side of the peripheral edge 64, the flexible member 48 can include another peripheral edge 64. Therefore, in other embodiments, the closure apparatus 54 can be secured to the other peripheral edge 64. Alternatively, both peripheral edges 64 can include one or more closure apparatuses 54. It is to be appreciated that the closure apparatus 54 can be in any suitable location and the Figures illustrate one non-limiting example.

Furthermore, the closure apparatus 54 can be any suitable configuration. In certain embodiments, the closure apparatus 54 is defined as a zipper or a plurality of zippers. Other non-limiting examples of the closure apparatus 54 can be buttons, snaps, clips, hook and loop closures, etc., and/or combinations thereof. For illustrative purposes only, FIG. 3 illustrates a plurality of zippers, but can be one zipper instead. Additionally, the closure apparatus 54 can be any suitable length. For example, the closure apparatus 54 can extend substantially the same length as the peripheral edge 64 or any suitable length less than the peripheral edge 64.

When the flexible member 48 is in the retracted position the second end 60 of the flexible member 48 is spaced from the second leg 34, i.e., not attached to the second leg 34. Furthermore, when it is desirable to return the flexible member 48 back to the retracted position from the extended position when the flexible member 48 is being utilized as the storage structure 46, the second end 60 of the flexible member 48 can be detached from the second leg 34. By the second end 60 of the flexible member 48 being detachable, the flexible member 48 can be movable to other orientations which do not utilize the second leg 34.

Referring to FIG. 3, the second end 60 of the flexible member 48 can include a plurality of fastening features 66 configured to secure the second end 60 to the second leg 34 when the flexible member 48 is in the extended position (when utilizing the storage structure 46). Therefore, when the multifunctional apparatus 28 is in the storage position (which is when the flexible member 48 is in the retracted position), the fastening features 66 are detached from the second leg 34. The fastening features 66 of the second end 60 can remain secured to the flexible member 48 regardless of the flexible member 48 being in the retracted and extended positions. The second end 60 can be secured to the second leg 34 by any suitable fastening feature(s) 66, and non-limiting examples can include one or more of fasteners, tabs, clips, snaps, buttons, hook and loop closures, ties, clamps, etc., and/or combinations thereof.

Turning to the awning structure 42 of FIG. 2, the first end 56 of the flexible member 48 is fixed to the first leg 32 regardless of the flexible member 48 being in the retracted and extended positions. Therefore, the first end 56 of the flexible member 48 can remain fixed to the first leg 32 when the multifunctional apparatus 28 is in the use position and the storage position. Also for the awning structure 42, the second end 60 of the flexible member 48 is spaced from the first end 56 and movable away from the first leg 32 when the flexible member 48 is in the extended position. When the flexible member 48 is in the extended position (for the awning structure 42), a majority of the flexible member 48 does not overlap the roof portion 18 (as compared to the storage structure 46 in which the majority of the flexible member 48 overlaps the roof portion 18). As such, when the flexible member 48 is in the extended position, the flexible member 48 extends outwardly from one of the sides of the vehicle 10 to cover the ground proximal to the vehicle 10. Therefore, the flexible member 48 can operate as an awning, under which one or more users can be at least partially covered when the flexible member 48 is in the extended position. When the flexible member 48 is in the extended position as the awning structure, the first panel 50 can face the ground.

Continuing with FIG. 2, the support structure 26 can include a rod 68 movable relative to the first leg 32. The rod 68 can support the flexible member 48 when the flexible member 48 is in the extended position and operating as the awning structure 42. The rod 68 can include a distal end 70 movable between a first position away from the first leg 32 (see FIG. 2) and a second position in which the distal end 70 of the rod 68 is disposed closer to the first leg 32 than when in the first position (see FIG. 3). Said differently, the first position is when the distal end 70 of the rod 68 does not overlap the roof portion 18 and the second position is when the distal end 70 of the rod 68 overlaps the roof portion 18. Generally, the rod 68 is disposed in the second position when the storage structure 46 is being utilized (as shown in FIG. 3).

As discussed above, the support structure 26 can include the plurality of housings 36, 38, and in certain embodiments, referring to FIG. 2, can include a first housing 36 and a second housing 38 spaced from each other and each disposed in a different direction from the first leg 32. More specifically, the first and second housings 36, 38 are each disposed in a cross-car direction which is a different direction from the first leg 32. The first and second housings 36, 38 can be in the different direction from a direction defined by the first leg 32. The cross-car direction can be across the passenger compartment 16 between corresponding passenger doors. The first and second legs 32, 34 are disposed in a direction along the length of the vehicle 10 between the front and back ends 20, 22 of the vehicle 10.

Furthermore, the rod 68 is disposed in the same direction as the first and second housings 36, 38. More specifically, the rod 68 can include a first rod segment 72 movable into and out of the first housing 36 and a second rod segment 74 movable into and out of the second housing 38. Simply stated, the first and second rod segments 72, 74 can telescope out of the respective housings 36, 38 (see arrow 76 for the direction that the segments 72, 74 telescope out in FIG. 2) when moving to the first position and retract into the respective housings 36, 38 when moving to the second position.

The first housing 36 can be supported by a pair of the corner members 30 and the second housing 38 can be supported by another pair of the corner members 30. Therefore, each of the corner members 30 directly supports one housing 36, 38 and one leg 32, 34. The first and second rod segments 72, 74 telescope into and out of respective corner members 30. Therefore, two of the corner members 30 can define openings 78 (see FIG. 7) in which the first and second rod segments 72, 74, respectively, are movable through.

Optionally, the first rod segment 72 can include more than one piece such that the pieces telescope inside one another and inside the first housing 36. Similarly, the second rod segment 74 can optionally include more than one piece such that the pieces telescope inside one another and inside the second housing 38. The number of pieces for the first and second rod segments 72, 74 can depend on the maximum length that the rod 68 can extend when in the first position. When the rod 68, and thus the first and second rod segments 72, 74, is supporting the flexible member 48 in the use position as the awning structure 42, the rod segments 72, 74 can be maintained in the first position by any suitable method, and non-limiting examples can include one or more of fasteners, tabs, clips, snaps, buttons, hook and loop closures, ties, clamps, friction fit, biasing members, wedges in which the rod segments 72, 74 are rotated to cause the wedges to engage a surface, apertures or holes defined in the rod segments 72, 74 in which the biasing member moves into and out, apertures or holes defined in the rod segments 72, 74 in which the clips, tabs, clamps, etc. are placed in, and/or combinations thereof.

The rod 68 can include a fastening feature(s) 80 configured to secure the second end 60 of the flexible member 48 to the distal end 70. More specifically, the first and second rod segments 72, 74 can each include the distal end 70, and each of the distal ends 70 can include the fastening feature(s) 80 configured to secure the second end 60 of the flexible member 48 to the respective distal ends 70. Generally, the first and second rod segments 72, 74 are extended to the first position before moving the flexible member 48 to the use position and securing the second end 60 of the flexible member 48 to the rod segments 72, 74. It is to be appreciated that, in certain embodiments, the second end 60 of the flexible member 48 can be secured to first and second rod segments 72, 74 before extending the segments 72, 74 to the first position. The fastening feature(s) 80 can be any suitable configuration, and non-limiting examples can include one or more of fasteners, tabs, clips, snaps, buttons, hook and loop closures, ties, clamps, etc., a groove 82 (see FIG. 7), an aperture or hole in which the fastening feature(s) 66 of the second end 60 are placed in, and/or combinations thereof. When utilizing the groove 82 defined in the distal end 70 of the rod segments 72, 74, one or more of the fastening feature(s) 66 of the second end 60 of the flexible member 48 can loop around the distal end 70 of the rod segments 72, 74 and rest in the groove 82. The groove 82 maintains the fastening feature(s) 66 of the second end 60 therein.

As shown in FIG. 2, the first and second rod segments 72, 74 are spaced from each other. Therefore, when the first and second rod segments 72, 74 are in the first position, the flexible member 48 is disposed between the segments 72, 74 when in the use position. The first and second rod segments 72, 74 at least partially support the flexible member 48 when in the use position. The first and second rod segments 72, 74 can extend out of the first and second housings 36, 38 respectively when in the first position (see FIG. 2) and the second end 60 of the flexible member 48 can be secured to the distal end 70 of each of the first and second rod segments 72, 74 (when operating as the awning structure 42). The flexible member 48 can create a top cover when in the extended position to further define the awning structure 42 in the use position.

Referring to FIG. 2, optionally, for the awning structure 42 and the concealment structure 44, one or more uprights 84 can be utilized to support the rod 68. The optional uprights 84 are illustrated in phantom lines in FIG. 2. In certain embodiments, one of the uprights 84 supports the distal end 70 of the first rod segment 72 and another one of the uprights 84 supports the distal end 70 of the second rod segment 74. The uprights 84 can be hinged to the respective distal end 70 of the rod segments 72, 74 such that the uprights 84 can rotate relative to the respective distal end 70 to a vertical position in the direction of the arrow 86.

The uprights 84 are stored in the respective housings 36, 38 when the multifunctional apparatus 28 is in the storage position. Movement of the rod segments 72, 74 between the first and second positions correspondingly moves the uprights 84, and once the rod segments 72, 74 are in the first position (to use the awning structure 42), the uprights 84 can be rotated to the vertical position such that one end of each of the uprights 84 is supported by the ground and the other end of each of the uprights 84 supports the respective distal end 70 of the rod segments 72, 74. The uprights 84 can also be telescoping as similarly discussed for the rod segments 72, 74.

The uprights 84 are configured to complement the general shape of the rod segments 72, 74 so the uprights 84 can also be housed in the respective housings 36, 38. For example, if the rod segments 72, 74 are generally circular, the uprights 84 are semi-circular to allow the uprights 84 to cradle the circular shape of the rod segments 72, 74 when telescoping into and out of the respective housings 36, 38.

The discussion above for the awning structure 42 also applies to the concealment structure 44. Specifically, the flexible member 48 doubles as the top cover for both the awning structure 42 and the concealment structure 44. As such, the flexible member 48 can create the top cover when in the extended position to further define the concealment structure 44 in the use position. Therefore, see the above discussion under the awning structure 42 for how the flexible member 48 operates with the rod 68 and the housings 36, 38, which also applies for the concealment structure 44.

Figure 6:
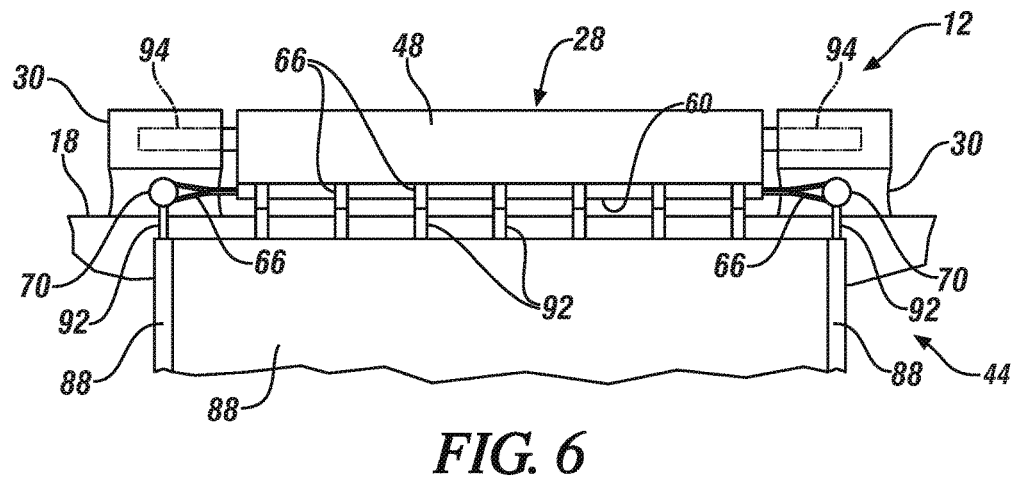
FIG. 6 is a schematic fragmentary side view of the vehicle, with the multifunctional apparatus in the use position to operate as the concealment structure.
Figure 5:
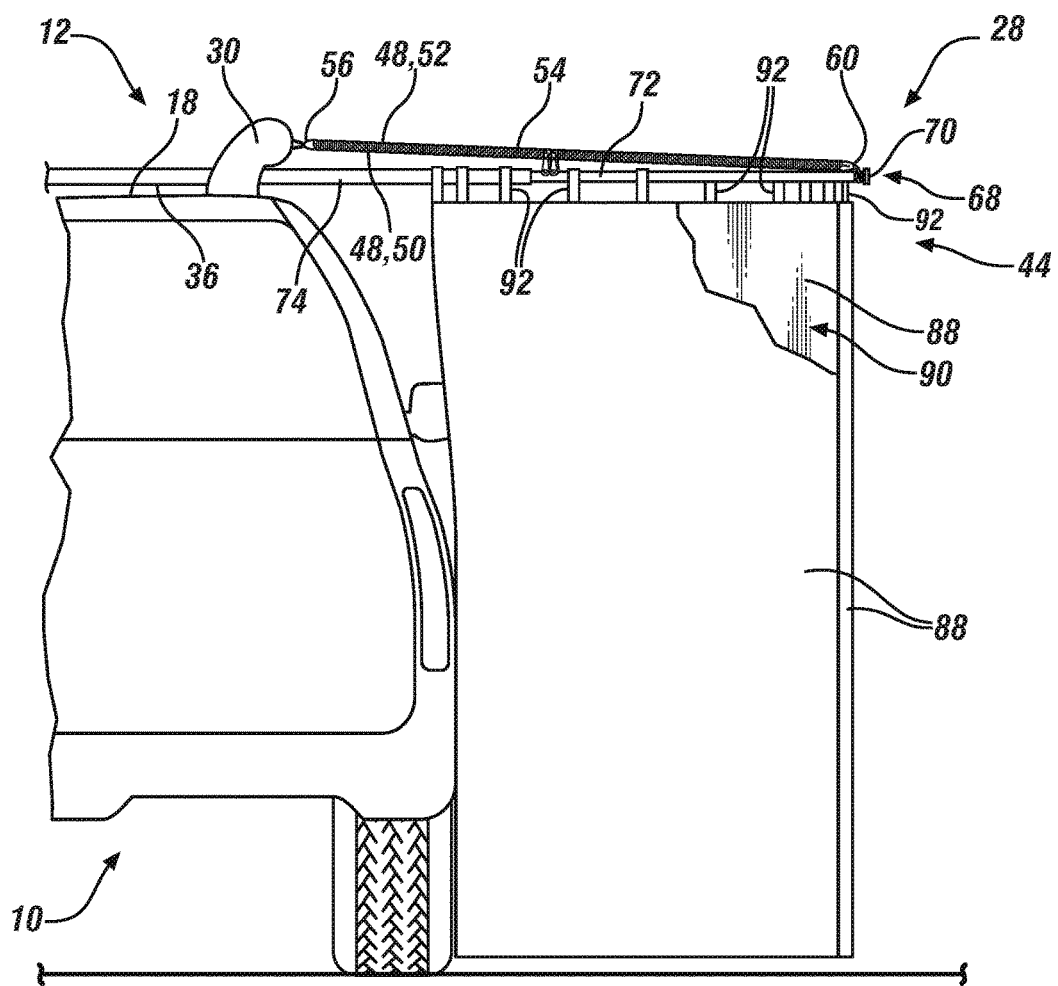
FIG. 5 is a schematic fragmentary end view of the vehicle, with the multifunctional apparatus in the use position to operate as a concealment structure.

The extended position of the flexible member 48 as shown in FIG. 2 for the awning structure 42 is also illustrative of the extended position of the flexible member 48 for the concealment structure 44. In addition, as shown in FIGS. 5 and 6, the concealment structure 44 can include a side cover 88 supported by the first and second rod segments 72, 74. The side cover 88 can cooperate with the top cover to close a space 90 between the top cover and the side cover 88 to further define the concealment structure 44 in the use position. The side cover 88 can be one single piece or can be multiple pieces.

Continuing with FIGS. 5 and 6, the side cover 88 can include a plurality of fastening features 92 configured to selectively secure the side cover 88 to the first and second rod segments 72, 74. Furthermore, some of the fastening features 92 can be configured to secure the side cover 88 to the second end 60 of the flexible member 48 (best shown in FIG. 6). Specifically, some of the fastening features 92 of the side cover 88 and some of the fastening features 66 of the second end 60 of the flexible member 48 engage each other to secure the side cover 88 to the flexible member 48.

The side cover 88 can be removable and stored when not in use. Therefore, when the multifunctional apparatus 28 is in the storage position (which is when the flexible member 48 is in the retracted position), the fastening features 92 are detached from the first and second rod segments 72, 74 and the second end 60 of the flexible member 48. The fastening features 92 can be any suitable configuration, and non-limiting examples can include one or more of fasteners, tabs, clips, snaps, buttons, hook and loop closures, ties, clamps, etc., and/or combinations thereof.

As discussed above, the flexible member 48 is movable relative to the support structure 26 between the retracted and extended positions. More specifically, the flexible member 48 is movable relative to the first leg 32 of the support structure 26 between the retracted and extended positions. Regardless of whether the multifunctional apparatus 28 is being operated as the awning structure 42, the concealment structure 44 or the storage structure 46, for all of these configurations, the flexible member 48 is moved to the extended position when the multifunctional apparatus 28 is in the use position. As such, when it is desired to return the multifunctional apparatus 28 to the storage position, the flexible member 48 is moved from the extended position back to the retracted position.

Therefore, the support structure 26 can include a return apparatus 94 (see FIGS. 2-4) configured to move the flexible member 48 from the extended position back to the retracted position. The return apparatus 94 is shown in phantom lines in FIGS. 2-4 for illustrative purposes. The return apparatus 94 can be spring loaded to wind or roll up the flexible member 48 relative to the first leg 32. Therefore, for example, the first leg 32 can be rotatable relative to the corner, and the return apparatus 94 can cause the first leg 32 to rotate to wind or roll up the flexible member 48 about the first leg 32. The return apparatus 94 can be disposed in one or more of the corner members 30. The return apparatus 94 can be any suitable configuration, and spring biased is one non-limiting example.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A roof rack assembly comprising:
a support structure; and
a multifunctional apparatus supported by the support structure;
wherein the multifunctional apparatus is configured to operate as an awning structure, a concealment structure and a storage structure, with at least a portion of the multifunctional apparatus being movable relative to the support structure between a storage position in which the multifunctional apparatus is not operable and a use position in which the multifunctional apparatus is operable, wherein the multifunctional apparatus includes a flexible member movable relative to the support structure between a retracted position when the multifunctional apparatus is in the storage position and an extended position when the multifunctional apparatus is in the use position, wherein the flexible member includes a first panel and a second panel overlapping each other, and wherein the flexible member includes a closure apparatus coupled to the first and second panels to further define the storage structure.

2. The assembly as set forth in claim 1 wherein the closure apparatus is movable between an open position allowing entry into the flexible member between the first and second panels when in the use position and a closed position preventing entry into the flexible member between the first and second panels when in the storage position.

3. The assembly as set forth in claim 2 wherein the closure apparatus is defined as a zipper.

4. The assembly as set forth in claim 2 wherein the support structure includes a first leg and a second leg spaced from and opposing each other, and wherein the flexible member includes a first end fixed to the first leg regardless of the flexible member being in the retracted and extended positions, and a second end attached to the second leg when the flexible member is in the extended position to further define the storage structure.

5. The assembly as set forth in claim 4 wherein the second end of the flexible member includes a plurality of fastening features configured to secure the second end to the second leg when the flexible member is in the extended position.

6. The assembly as set forth in claim 4 wherein the flexible member includes a peripheral edge disposed adjacent to the first and second ends when the flexible member is in the extended position, and wherein the closure apparatus is secured to the peripheral edge.

7. The assembly as set forth in claim 1 wherein the support structure includes a first leg and a rod movable relative to the first leg, and wherein the rod includes a distal end movable between a first position away from the first leg and a second position in which the distal end of the rod is disposed closer to the first leg than when in the first position, and wherein the flexible member includes a first end fixed to the first leg regardless of the flexible member being in the retracted and extended positions, and includes a second end spaced from the first end and movable away from the first leg when the flexible member is in the extended position.

8. The assembly as set forth in claim 7 wherein the support structure includes a first housing and a second housing spaced from each other and each disposed in a different direction from the first leg, and wherein the rod includes a first rod segment movable into and out of the first housing and a second rod segment movable into and out of the second housing, with the first and second rod segments extending out of the first and second housings respectively when in the first position and the second end of the flexible member secured to the distal end of each of the first and second rod segments.

9. The assembly as set forth in claim 8 wherein the flexible member creates a top cover when in the extended position to further define the awning structure in the use position.

10. The assembly as set forth in claim 8 wherein the flexible member creates a top cover when in the extended position to further define the concealment structure in the use position.

11. The assembly as set forth in claim 10 wherein the concealment structure further includes a side cover supported by the first and second rod segments, and the side cover cooperates with the top cover to close a space between the top cover and the side cover to further define the concealment structure in the use position.

12. A vehicle comprising:
a body including a roof portion;
a roof rack assembly attached to the body above the roof portion, the assembly comprising:
a support structure; and
a multifunctional apparatus supported by the support structure;
wherein the multifunctional apparatus is configured to operate as an awning structure, a concealment structure and a storage structure, with at least a portion of the multifunctional apparatus being movable relative to the support structure between a storage position in which the multifunctional apparatus is not operable and a use position in which the multifunctional apparatus is operable, wherein the multifunctional apparatus includes a flexible member movable relative to the support structure between a retracted position when the multifunctional apparatus is in the storage position and an extended position when the multifunctional apparatus is in the use position, wherein the flexible member includes a first panel and a second panel overlapping each other, and wherein the flexible member includes a closure apparatus coupled to the first and second panels to further define the storage structure.

13. The vehicle as set forth in claim 12 wherein the closure apparatus is movable between an open position allowing entry into the flexible member between the first and second panels when in the use position and a closed position preventing entry into the flexible member between the first and second panels when in the storage position.

14. The vehicle as set forth in claim 13 wherein the support structure includes a first leg and a second leg spaced from and opposing each other, and wherein the flexible member includes a first end fixed to the first leg regardless of the flexible member being in the retracted and extended positions, and a second end attached to the second leg when the flexible member is in the extended position such that the flexible member is disposed over the roof portion.

15. The vehicle as set forth in claim 14 wherein the flexible member includes a peripheral edge disposed adjacent to the first and second ends when the flexible member is in the extended position, and wherein the closure apparatus is secured to the peripheral edge.

16. The vehicle as set forth in claim 12 wherein the support structure includes a first leg and a rod movable relative to the first leg, and wherein the rod includes a distal end movable between a first position in which the distal end of the rod does not overlap the roof portion and a second position in which the distal end of the rod overlaps the roof portion, and wherein the flexible member includes a first end fixed to the first leg regardless of the flexible member being in the retracted and extended positions and a second end spaced from the first end and movable away from the first leg when the flexible member is in the extended position such that a majority of the flexible member does not overlap the roof portion.

17. The vehicle as set forth in claim 16 wherein the support structure includes a first housing and a second housing spaced from each other and each disposed in a cross-car direction which is a different direction from a direction defined by the first leg, and wherein the rod includes a first rod segment movable into and out of the first housing and a second rod segment movable into and out of the second housing, with the first and second rod segments extending out of the first and second housings respectively when in the first position and the second end of the flexible member secured to the distal end of each of the first and second rod segments.

* * * * *